United States Patent Office 2,957,055
Patented Oct. 18, 1960

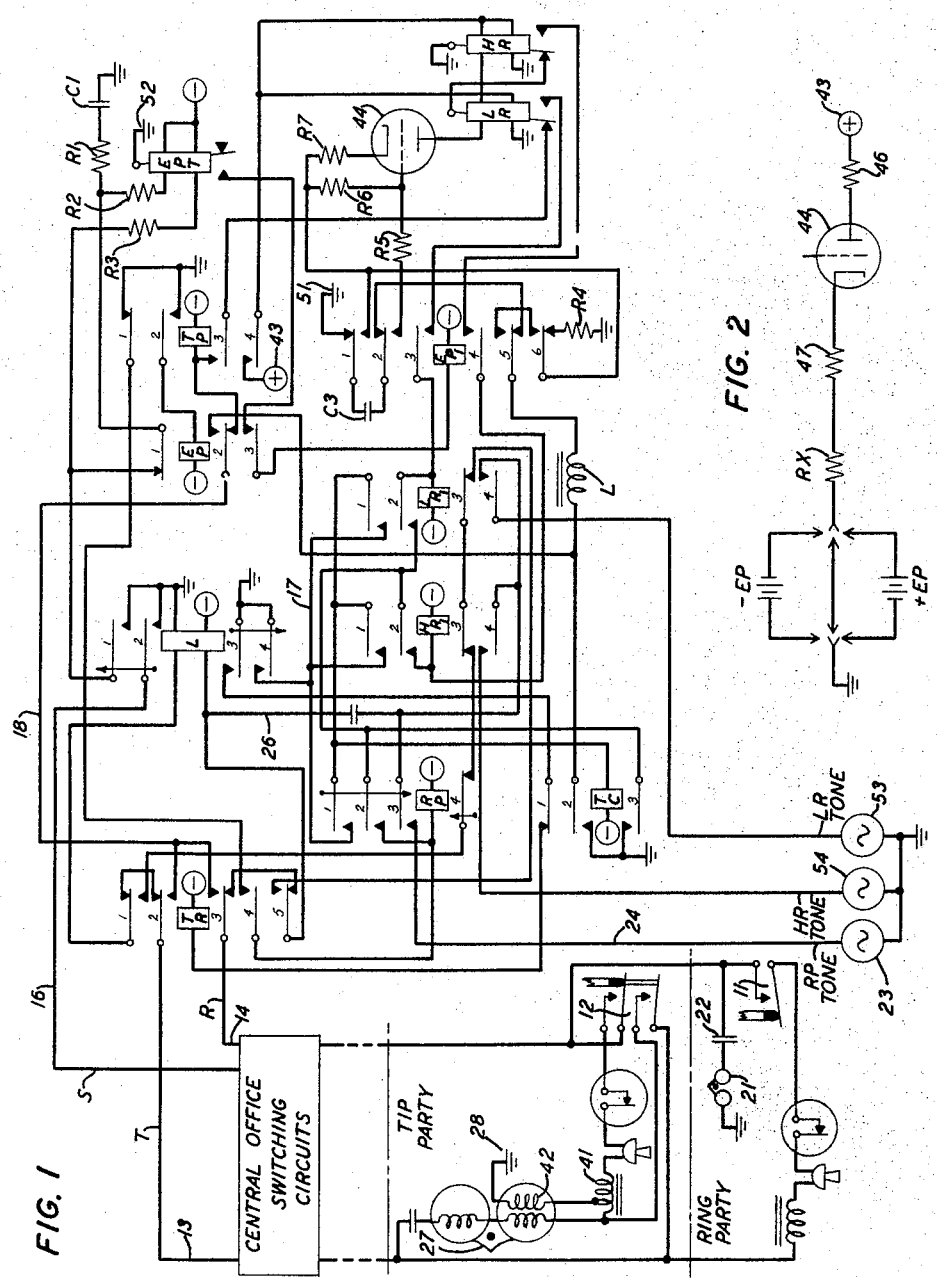

2,957,055

TESTING SYSTEM

Alfred E. Vitalo, Brooklyn, N.Y., assignor to Bell Telephone Laboratories, Incorporated, New York, N.Y., a corporation of New York Filed May 22, 1959, Ser. No. 815,168

6 Claims. (Cl. 179—175.2)

This invention relates to testing arrangements, and more particularly to a circuit for testing telephone ringers at subscribers' stations.

In present day telephone systems ringers of various different resistance ranges are commonly used. For example, in the instance of the so-called two-party subscribers' line, one ringer is usually connected to the ring side of the line at one station and one ringer is connected to the tip side of the line at the other station. For certain operating reasons with which we are not here concerned, but which may involve, for example, identification of the subscriber for charging purposes, the ringer at the tip station may be one of three different resistances, for example of the order, respectively, of 960 ohms, 2650 ohms or 3640 ohms. The 960-ohm ringer is commonly referred to as a "low resistance" ringer and the 2650-ohm and 3640-ohm ringers are commonly referred to as "high resistance" ringers.

For accurate operation of the over-all system it is essential that a ringer of the proper resistance be connected in a particular circuit. For example, if a "high resistance" ringer were installed by error at a tip station requiring a "low resistance" ringer, or vice versa, the entire desired operation of the system might well be impaired. It is standard practice, accordingly, for the installer, after he has completed the connections at the subscriber's station, to perform certain tests in conjunction with testing equipment provided at the central office to determine whether the ringer functions as required and, particularly, whether it is of the proper resistance.

An object of the present invention, therefore, is to improve the operation of ringer testing circuits.

A more specific object of the invention is to indicate with enhanced accuracy the resistance range of ringers installed at subscribers' stations.

It will be obvious, of course, that accurate measurements of the ringer resistance will be rendered difficult in instances where earth potential voltages are present on the line.

A particular feature of the present invention, therefore, resides in means for compensating fully for any direct-current earth potential voltages present on the line at the time the ringer is tested.

In accordance with a specific embodiment of the invention an electronic detector circuit at the central office is utilized for distinguishing between "high resistance" and "low resistance" ringers at the subscriber's stations. Means are included for compensating for earth potential voltages on the line which comprises a capacitor charged to the earth potential voltage and then discharged into the input circuit of the detector thereby to modify the output thereof to offset the effect of the earth potential voltage.

A full understanding of the arrangement contemplated by the present invention as well as an appreciation of the various advantageous features may be gained from a consideration of the following detailed description in connection with the accompanying drawings in which:

Fig. 1 shows a ringer test circuit which embodies features of the present invention; and Fig. 2 is a skeletonized representation of the resistances and potentials involved in the testing operation.

Referring now to Fig. 1, there is illustrated at the central office a ringer test circuit of the nature contemplated by the present invention, together with a schematic showing of essential portions of a two-party subscribers' line. In order to avoid complication of the drawing and to clarify the description, portions of the line circuits which are not involved in the operation of the ringer test circuit have not been shown, and for the same reasons, the central office switching circuits, which in themselves are well known in the art, have not been shown in detail.

It will be assumed that an installer at either the station of the Tip Party or the station of the Ring Party has completed connection of a ringer, and wishes to test it for correct resistance range. When the handset is removed from the cradle at the subscriber's station the associated switchhook, i.e., either 11 or 12, will operate to close the line. By dialing a preassigned code the ringer test circuit at the central office will be seized and connected to the line. When the circuit is seized, a bridge is connected across tip 13 and ring 14 in the usual manner, and relay L operates over a circuit from battery, lower winding of relay L, No. 5 break contacts and No. 3 break contacts of relay TR, ring lead 14, over the bridge (not shown) to tip lead 13, No. 2 and No. 1 break contacts of relay TR, upper winding of relay L to ground. Operation of relay L connects ground over its No. 2 contacts to sleeve conductor 16 and makes the circuit "busy" in the usual manner. Operation of relay L also establishes an operating path for relay TR, traced from battery, winding of relay TR, No. 1 contacts of relay TC, No. 3 contacts of relay L to ground, relay TR operating over this path.

Also, relay L by its operation establishes an energizing path for polarized timing relay EPT, this path being traced from battery, lower winding of relay EPT, resistor R3, No. 1 contacts of relay L to ground. Relay EPT does not operate at this time however in view of the bridging path at the No. 1 contacts of relay EP which is in unoperated position. An operating path for relay TC is partially completed by operation of relay L in that ground is connected through the No. 4 contacts to lead 17. The completion of this path will be described subsequently.

Relay TR in operating connects tip lead 13 and ring lead 14 in simplex (No. 2 and No. 3 make contacts) and over lead 18, No. 2 break contacts of relay EP to the winding of relay TP. Operation of relay TR also results in operation of relay RP over a path traced from battery, winding of relay RP, No. 4 contacts of relay TR, No. 1 contacts of relay TP to ground. Also, a holding path for relay L is completed by operation of relay TR, this path being traced from battery, lower winding of relay L, No. 5 make contacts of relay TR, No. 3 contacts of relay LR1, No. 3 contacts of relay HR1, No. 4 contacts of relay RP, No. 1 make contacts of relay TR, upper winding of relay L to ground. (Relay L being slow to release remained operated during the brief interval when its original operating path described above was interrupted by operation of relay TR.)

It will be assumed first that the installer has connected ringer 21 at the ring party station. In this instance there will be no ground on the line with regard to direct current in view of the provision of capacitor 22 between the line and the ringer ground.

Relay RP by its operation over the path traced above completes an operating path for relay TC traced from battery, winding of relay TC, No. 1 contacts of relay RP, No. 4 contacts of relay L to ground. Operation of relay TC establishes a holding path for relay RP traced from battery, winding and No. 2 contacts of relay RP, No. 3 contacts of relay TC to ground.

Since the holding path for relay L previously described included the No. 4 (break) contacts of relay RP, it is clear that this holding path is interrupted by operation of relay RP. However, relay L is slow to release, and before it releases, relay TR releases since its operating path is interrupted at the No. 1 (break) contacts of relay TC when relay TC operates. Relay TR upon releasing reconnects the tip lead 13 and the ring lead 14 to the windings of relay L which is then held operated because of the bridge across the tip and ring referred to above.

With relay RP operated, "ring party ringer" tone is transmitted over the line from tone source 23, lead 24, No. 3 contacts of relay RP, lead 26, No. 5 and No. 3 break contacts of relay TR, and over ring lead 14 to the distant station. Receipt of this distinctive tone by the installer indicates to him that he has connected the telephone set for a ring party customer. In this instance, that is when the ring party station is involved, it is not necessary to test the ringer for determination of a high or low resistance range.

Supervision of the connection from this time is handled by relay L.

Assuming now that the installer had connected ringer 27 at the tip party station, we find ground 28 on the line with regard to direct current. It will be assumed also that, as above described, the circuit has been seized and that relays L and TR are operated; that a holding path has been established for relay L; that an energizing path has been established for relay EPT and that tip lead 13 and ring lead 14 have been simplexed and connected to the winding of relay TP.

Under the conditions just described relay TP operates over a path from battery, winding of relay TP, No. 2 break contacts of relay EP, No. 2 and No. 3 make contacts of relay TR over the simplexed tip 13 and ring 14 leads to tip party station, make contacts of switchhook 12, inductance 41, ringer winding 42 to ground 28. Relay RP, being slow to operate, does not operate at this time since the operating path (previously traced above) is interrupted at the No. 1 (break) contacts of relay TP which operates first.

Relay TP by its operation connects at its No. 4 contacts plate supply voltage source 43 through the primary windings of respective polarized relays HR and LR to the anode of vacuum tube 44. Relays HR and LR are biased in the positions shown; suitable biasing resistors may be connected in series with the lower windings of the relays if required although not shown in the drawing. Resistor R4, which is connected in the cathode circuit of vacuum tube 44 so long as relay EP1 is in non-operated position, is effective in assuring the desired operations of relays HR and LR.

Relay TP upon operating completes an operating path for relay EP, traced from battery, winding of relay EP, No. 2 contacts of relay TP to ground. Before discussing the further results of the operation of relays TP and EP, reference will be made for a moment to Fig. 2 of the drawings for discussion of the various resistance and potential elements involved in a ringer testing operation which will be further discussed subsequently. In the schematic showing of Fig. 2, resistance 46 represents the combined resistance value of the upper windings of relays HR and LR, which are connected as series elements between plate supply potential 43 and the anode of vacuum tube 44. Resistance 47 represents the combined resistance values of cathode biasing resistor R7 and inductance L. RX represents the combined resistance of the ringer and of the line loop and also represents the effects of any leakage resistance; that is the "unknown" resistance value which is to be measured. In the particular embodiment illustrated in Fig. 1, relay LR is biased on the contact shown for values of RX greater than 1900 ohms and operates to its other contact when RX becomes 1500 ohms or less. Conversely relay HR is biased on the contact shown for values of RX equal to or less than 1500 ohms and operates to its other contact when RX becomes 1900 ohms or greater. It will be understood, of course, that these values are by way of illustration and may be changed as the requirements of a particular system dictate. It is well known, however, that due to many different reasons, for example the proximity of power lines, earth potentials may be present on the line as represented in Fig. 2 by the alternative connections —EP or +EP. Now, if either a positive or a negative earth potential is present on the line during the measurement, it will, obviously, manifest itself in the series connection represented in Fig. 2 and an incorrect indication of the value of RX will of course result. Referring now again to Fig. 1 of the drawings the manner in which the presence of any disturbing earth potentials is compensated for will be described.

When relay EP operates, as above described, the simplexed tip lead 13 and ring lead 14 are transferred, at the No. 2 make contacts of relay EP, from the winding of relay TP to ground 51 through inductance L and capacitor C3, this path including No. 5 break, No. 2 break and No. 1 break contacts of relay EP1. This causes capacitor C3 to charge to the earth potential, if any, that may be present on the line between ground at the distant station and ground in the central office.

Operation of relay EP also interrupted at its No. 1 contacts the previously described bridge in the energizing path of the relay EPT, which relay thereupon starts its timing cycle. The required timing cycle of relay EPT is established by the characteristics of resistor R1 and capacitor C1 which are included in the operating circuit. Upon completion of the timing cycle, relay EPT will operate to its left contact and an operating path will be completed for relay EP1, traced from ground 52, left contact of relay EPT, No. 3 contacts of relay EP, winding of relay EP1 to battery.

Upon operation of relay EP1, the simplexed tip lead 13 and ring lead 14, including inductance L, will be connected through the No. 5 make and No. 6 make contacts of relay EP1 to the anode circuit of vacuum tube 44. At the same time capacitor C3 is connected through No. 1 make contacts and No. 2 make contacts of relay EP1 to the grid circuit of vacuum tube 44 and discharges into that circuit thereby to compensate for the effect on the tube circuit of any ground potential included on the line and supplied through inductance L to the anode circuit.

The measuring circuit will now be, basically, as represented schematically in Fig. 2, and if a "low resistance" ringer is connected at the tip party station, that is if the value of RX as defined above including the resistance of winding 42 of ringer 27 is less than 1500 ohms, LR relay will operate to its right-hand contact; this will complete an operating path for relay LR1, traced from battery, winding of relay LR1, No. 3 contacts of relay EP1, right-hand contact and armature of relay LR, left-hand contact and armature of relay HR to ground. Operation of relay LR also causes relay TP to release since the holding circuit described above is interrupted at the left-hand contact of relay LR.

Operation of relay LR1 completes an operating path for relay TC traced from battery, winding of relay TC, No. 1 contacts of relay LR1, No. 4 contacts of relay L to ground. Upon operation of relay TC, relay TR releases since the previously described energizing path is interrupted at the No. 1 contacts of relay TC. Operation of relay TC establishes a holding path for relay LR1 traced from battery, winding and No. 2 contacts of relay LR1, No. 3 contacts of relay TC to ground.

Also, with relay LR1 operated, "low resistance ringer" tone is applied to the line from source 53, No. 4 contacts of relay LR1, lead 26, No. 5 break and No. 3 break contacts of relay TR to ring conductor 14 and over the line to the tip party station where the tone indicates to the installer that a "low resistance" ringer has been connected at the station.

With relay TP released as above described plate supply voltage 43 is removed from the windings of relays HR and LR and from vacuum tube 44, and, also, the operating path of relay EP is interrupted and relay EP releases. Release of relay EP restores the shunting bridge on the energizing path of relay EPT, which then releases, and also interrupts the operating path of relay EP1 which releases. Supervision of the circuit from this point on is handled by relay L as in the instance mentioned above where the ring party station is involved.

Let it be assumed now for purposes of further description that a "high resistance" ringer is connected at the tip party station, that is that the value of RX including the resistance of winding 42 of ringer 27 is greater than 1900 ohms. In this instance relay HR will operate instead of relay LR. Basically, the further operation of the circuit will be as above described except that relay HR1 will operate, over an obvious circuit (instead of relay LR1), and "high resistance ringer" tone from source 54 will be applied to the line. This tone will indicate to the installer that a "high resistance" ringer has been connected at the tip party station.

It will be apparent from the above description that the novel arrangement contemplated by the invention provides for complete compensation for the effects on the measurement of ground potentials (if any) either negative or positive which may exist on the line. It will be apparent, further, that the arrangement is applicable also in the measurement of the resistance range of devices other than ringers.

While a specific embodiment of the invention has been given by way of detailed description, the invention is not limited in its application to said embodiment. Other embodiments will be evident to those skilled in the art.

What is claimed is:

1. In a communication system, a line terminating at one end at a central point and at the other end at a remote point, a device at said remote point having a resistance within a given resistance range, and means including a vacuum tube at said central point for indicating the resistance of said device, said indicating means including means for compensating for the effects of ground potential on the line, said compensating means including a capacitor, means for charging said capacitor to the value of said ground potential, means for discharging said capacitor into the input circuit of said vacuum tube, and means responsive to the operation of said vacuum tube for indicating the resistance range of said ringer.

2. In a telephone system, a line terminating at one end in a central office and at the other end in a subscriber's station, a ringer having a resistance within a given resistance range at said subscriber's station, and means including a vacuum tube at said central office for indicating the resistance of said ringer, said indicating means including means for compensating for the effects of ground potential on the line, said compensating means including a capacitor, means for charging said capacitor to the value of said ground potential, means for discharging said capacitor into the input circuit of said vacuum tube, and means responsive to the operation of said vacuum tube for indicating the resistance range of said ringer.

3. In a telephone system, a line terminating at one end in a central office and at the other end in a subscriber's station, a ringer having a resistance within a given resistance range at said subscriber's station, and means including a vacuum tube at said central office for indicating the resistance of said ringer, said indicating means including means for compensating for the effects of ground potential on the line, said compensating means including a capacitor, means for connecting said capacitor to said line for charging the capacitor to the value of said ground potential, a timing circuit for controlling the duration of said connection to the line and for thereafter connecting said capacitor into the input circuit of said vacuum tube, and means responsive to the operation of said vacuum tube for indicating the resistance range of said ringer.

4. In a telephone system, a line terminating at one end in a central office and at the other end in a subscriber's station, a ringer having a resistance within a given resistance range connected to said line at said subscriber's station, a vacuum tube at said central office having cathode, grid and anode electrodes, means associated with said vacuum tube for indicating the resistance range of a circuit connected thereto, a capacitor at said central office, means at said central office for connecting said capacitor to said line for a predetermined interval thereby to charge said capacitor to the value of any ground potential existing on said line, means effective at the end of said time interval for connecting said line to the cathode of said vacuum tube and for simultaneously connecting said capacitor for discharge into the input circuit of said vacuum tube thereby to compensate for the effects of any ground potential existing on said line, and means responsive to the operation of said vacuum tube for indicating the resistance range of said ringer.

5. In a telephone system, a line terminating at one end in a central office and at the other end in a subscriber's station, a ringer having a resistance within a given resistance range connected to said line at said subscriber's station, a vacuum tube at said central office having cathode, grid and anode electrodes, a voltage source at said central office, a first marginal relay and a second marginal relay connected in series between the anode of said vacuum tube and said voltage source, a capacitor at said central office, means effective for a predetermined time interval for connecting said capacitor to said line for charging the capacitor to the value of any ground potential existing on the line, means effective at the end of said interval for connecting the line to the cathode of said vacuum tube and for simultaneously connecting said capacitor for discharging into the input circuit of the vacuum tube thereby to compensate for the effects of any ground potential existing on the line, said first marginal relay operating when the resistance of said line connected to said vacuum tube is below a certain upper limit and said second marginal relay operating when the resistance of said line connected to said vacuum tube is above a certain lower limit, and means responsive to operation of one or the other of said relays for indicating the resistance range of the ringer connected to said line.

6. In a telephone system, a line terminating at one end in a central office and at the other end in a subscriber's station, a ringer having a resistance within a given resistance range connected to said line at said subscriber's station, a vacuum tube at said central office having cathode, grid and anode electrodes, a voltage source at said central office, a first marginal relay and a second marginal relay connected in series between the anode of said vacuum tube and said voltage source, a capacitor at said central office, means effective for a predetermined time interval for connecting said capacitor to said line for charging the capacitor to the value of any ground potential existing on the line, means effective at the end of said interval for connecting the line to the cathode of said vacuum tube and for simultaneously connecting said capacitor for discharging into the input circuit of the vacuum tube thereby to compensate for the effects of any ground potential existing on the line, said first marginal relay operating when the resistance of said line connected to said vacuum tube is below a certain upper limit and said second marginal relay operating when the resistance of said line connected to said vacuum tube is above a certain lower limit, a first tone source at said central office for indicating a low resistance range ringer, a second tone source at said central office for indicating a high resistance range ringer, means responsive to operation of said first marginal relay for transmitting tone from said first source over said line to said subscriber's station, and means responsive to operation of said second marginal relay for transmitting tone from said second source over said line to said subscriber's station.

No references cited.